United States Patent [19]
Bederke et al.

[11] Patent Number: 5,731,382
[45] Date of Patent: Mar. 24, 1998

[54] COATING AGENTS AND THEIR USE IN PARTICULAR IN THE PRODUCTION OF TRANSPARENT AND PIGMENTED TOP COATINGS

[75] Inventors: Klaus Bederke, Sprockhövel; Gerhard Bremer, Frechen; Hermann Kerber, Wuppertal; Manfred Krumme, Erftstadt; Fritz Sadowski, Pulheim; Werner Stephan; Olaf Ley, both of Wuppertal, all of Germany

[73] Assignee: Herberts GmbH, Wuppertal, Germany

[21] Appl. No.: 718,729

[22] Filed: Sep. 24, 1996

Related U.S. Application Data

[63] Continuation of Ser. No. 520,300, Aug. 28, 1995, abandoned, which is a continuation of Ser. No. 262,586, Jun. 20, 1994, abandoned.

[51] Int. Cl.⁶ .................................................. C08F 8/30
[52] U.S. Cl. .................... 525/123; 525/127; 521/67; 521/70; 497/407.1; 497/409; 497/419.1; 497/140; 497/142; 428/423.1
[58] Field of Search ............... 521/70, 67; 525/123, 525/127; 427/407.1, 407, 412.1, 140, 142; 428/423.1

[56] References Cited

U.S. PATENT DOCUMENTS

| | | | |
|---|---|---|---|
| 4,388,445 | 6/1983 | Sugiura et al. | 525/124 |
| 5,227,201 | 7/1993 | Harper | 427/407.1 |

*Primary Examiner*—Duc Truong
*Attorney, Agent, or Firm*—Schweitzer Cornman Gross & Bondell LLP

[57] ABSTRACT

Coating agents are described, that are suitable for the production of pigmented or transparent top coatings, based on hydroxy-functional (meth)acrylic copolymers, aliphatic and/or cycloaliphatic polyisocyanates, solvents, and customary lacquer additives and pigments. They are free from epoxy resins and nitrocellulose and contain as binder A) one or more (meth)acrylic copolymers, containing hydroxyl groups, from a1) 47–53 wt % of one or more aromatic vinyl compounds, a2) 28–33 wt % of one or more hydroxyalkyl methacrylates, a3) 14–19 wt % of one or more alkyl (meth)acrylates, and a4) 0.5–2 wt % acrylic acid and/or methacrylic acid, with a hydroxyl number of 120–160 mg KOH/g, an acid number of 5 to 15 mg KOH/g, a weight-average molecular weight of 10,000 to 20,000 and a glass transition temperature of +40° C. to +60° C., and B) an aliphatic and/or cycloaliphatic polyisocyanate or a mixture of such polyisocyanates in such an amount that 0.5 to 2.0 isocyanate groups are present for one hydroxyl group of component A).

10 Claims, No Drawings

COATING AGENTS AND THEIR USE IN PARTICULAR IN THE PRODUCTION OF TRANSPARENT AND PIGMENTED TOP COATINGS

This is a continuation application of U.S. Ser. No. 08/520,300, filed Aug. 28, 1995; which was a continuation of U.S. Ser. No. 08/262,586, filed Jun. 20, 1994; both now abandoned.

The present invention provides coating agents based on hydroxyl-functional (meth)acrylic copolymers and polyisocyanates, that can be processed to weather-resistant coatings that are distinguished by rapid drying, high brilliance, security against sag, and weathering resistance.

Externally cross-linkable hydroxyl-functional (meth) acrylic copolymers that can be processed with polyisocyanates to weathering-resistant coatings are known. DE-A 24 60 329 describes low-molecular polymers based on styrene and (meth)acrylate esters with low molecular non-uniformity and a process for their manufacture. Such copolymers are on the one hand not justifiable from the economic standpoint, since their production is operated at high dilution (low yield, high solvent losses) and high proportions of initiators are used, and on the other hand since highly toxic by-products (e.g. tetramethylsuccinic acid dinitrile) are formed.

Moreover these known copolymers when used in lacquers do not meet the requirement of short drying times, trouble-free application and resistance to solvents, in particular premium gasoline.

In DE-0-35 46 594 the production is described of (meth) acrylic copolymers containing hydroxyl groups, which are said to be used together with epoxy resins and optionally nitrocellulose with polyisocyanates in lacquers, especially for the production of primers and crack filler coatings. Such lacquers have unsatisfactory properties with regard to yellowing and weather resistance.

The object of the invention was the provision of coating agents that are suitable in particular for top coatings (pigmented top coatings or transparent top coatings), provide short drying times, trouble-free application even when lacquering in only one spraying operation (that are sagproof and hotplate-safe) and lead to coatings that are free from yellowing and weather-resistant and produce high gloss, body and brilliance.

It has become evident that this object can be achieved by the following coating agents, that form one subject of the invention. These coating agents are based on hydroxy-functional (meth)acrylic copolymers, aliphatic and/or cycloaliphatic polyisocyanates, solvents, and optionally customary lacquer additives and pigments. They are characterised in that they are free from epoxy resins and nitrocellulose and contain as binder A) one or more (meth)acrylic copolymers, containing hydroxyl groups, from a1) 47–53 wt % of one or more aromatic vinyl compounds, a2) 28–33 wt % of one or more hydroxyalkyl methacrylates, a3) 14–19 wt % of one or more alkyl (meth)acrylates, and a4) 0.5–2 wt % acrylic acid and/or methacrylic acid, with a hydroxyl number of 120–160 mg KOH/g, an acid number of 5 to 15 mg KOH/g, a weight-average molecular weight of 10,000 to 20,000 and a glass transition temperature of +40° C. to +60° C., and B) an aliphatic and/or cycloaliphatic polyisocyanate or a mixture of such polyisocyanates in such an amount that 0.5 to 2.0 isocyanate groups are present for one hydroxyl group of component A).

According to a preferred embodiment of the invention, a (meth)acrylic copolymer is used as component A), wherein component a1) is styrene or a styrene derivative, component a2) is a hydroxyethyl methacrylate and component a3) is n-butyl methacrylate.

According to another preferred embodiment, component A) is obtainable from:

a1) 47.5–52.5 wt % styrene, a2) 28.0–33.0 wt % 2-hydroxyethyl methacrylate, a3) 14.0–19.0 wt % n-butyl acrylate and a4) 0.5–1.5 wt % acrylic acid.

The expression (meth)acrylic used here is intended to mean acrylic and/or methacrylic.

The (meth)acrylic copolymers included in the coating agent according to the invention may be manufactured by polymerization according to customary processes, e.g. bulk, solution or bead polymerization. The various polymerization processes are well known and described in: Houben-Weyl, Methoden der Organischen Chemie, 4. Aufl., Band 14/1, pp 24–255 (1961).

The solution polymerization process is preferred for the manufacture of the (meth)acrylic-copolymers used in the coating agent according to the invention. In this process the solvent is charged to the reaction vessel and heated to the boiling point and the monomers/initiator mixture is charged in a certain time.

The polymerization is preferably carried out at temperatures between 100° C. and 160° C., preferably between 130° C. and 150° C.

The polymerization reaction can be started with known polymerization initiators. Suitable initiators are for example per- and azo-compounds, which decompose thermally into radicals in a first-order reaction. The type and amount of the initiator are so chosen that at the polymerization temperature during the inflow phase, a radical supply exists that is as nearly constant as possible.

Examples of initiators for the polymerization that are preferably used are: dialkyl peroxides, such as di-tert-butyl peroxide and dicumyl peroxide; diacyl peroxides, such as dibenzoyl peroxide and dilauroyl peroxide; hydroperoxides, such as cumene hydroperoxide and tert-butyl hydroperoxide; peresters, such as tert-butyl perbenzoate, tert-butyl perpivalate, tert-butyl-per-3,5,5-trimethylhexanoate and tert-butyl-per-2-ethylhexanoate; peroxydicarbonates, such as di-2-ethylhexyl peroxydicarbonate and dicyclohexyl peroxydicarbonate; perketals, such as 1,1-bis(tert-butylperoxy)-3,5,5-trimethylcyclohexane and 1,1-bis(tert-butylperoxy)cyclohexane; ketone peroxides, such as cyclohexanone peroxide, and methyl isobutyl ketone peroxide; azo compounds, such as 2,2'-azobis(2,4-dimethylvaleronitrile), 2,2'-azobis(2-methylbutyronitrile), 1,1'-azobis (cyclohexanecarbonitrile) and azobis(isobutyronitrile).

The polymerization initiators, in particular the peresters, are preferably used in an amount of 0.2 to 5 wt % of the weight of monomers.

Compounds suitable as organic solvents, that can suitably be used in the solution polymerization as well as later in the coating agent according to the invention are for example: glycol ethers, such as ethylene glycol dimethyl ether; glycol ether esters, such as ethyl glycol acetate, butyl glycol acetate, 3-methoxy-n-butyl acetate, butyldiglycol acetate and methoxypropyl acetate; esters, such as butyl acetate, isobutyl acetate and amyl acetate; ketones, such as methyl ethyl ketone, methyl isobutyl ketone, diisobutyl ketone, cyclohexanone and isophorone; aromatic hydrocarbons, such as xylene and Solvesso 100 (registered trade mark); and aliphatic hydrocarbons can likewise be used, blended with the aforementioned solvents.

Chain-transfer agents can be co-utilized, especially in the preferred solution polymerization, for control of the molecular weight. Examples are mercaptans, thioglycolic acid esters, chlorohydrocarbons, cumene and dimeric α-methylstyrene The polymerization conditions (reaction temperature, inflow time of the monomer mixture, solution concentration) are so arranged that the (meth)acrylic copolymers for the coating agent according to the invention have a number-average molecular weight (determined by gel permeation chromatography using polystyrene as standard) of between 10,000 and 20,000.

The (meth)acrylic copolymers containing hydroxyl groups of the coating agent according to the invention fall in a glass transition temperature range of +40° C. to +60° C., calculated from the glass transition temperatures of the homopolymers of the individual monomers quoted in the literature (Fox equation, see e.g. Polymeric Materials, Batzer, 1935, page 307).

Compounds used as monomer components for the production of the (meth)acrylic copolymers containing hydroxyl groups according to the invention are aromatic vinyl compounds, preferably styrene and its derivatives, such as vinyltoluene, hydroxyalkyl methacrylates, especially with 2 to 4 C atoms in the alkyl component, preferably 2hydroxyethyl methacrylate, alkyl (meth)acrylates, especially with 2 to 6 C atoms in the alkyl component, preferably n-butyl acrylate, and (meth)acrylic acid, preferably acrylic acid.

The (meth)acrylic copolymers are combined in the coating agents according to the invention with cross-linking agents, namely polyisocyanates or prepolyisocyanates.

The proportion of polyisocyanate cross-linkers is so chosen that 0.5 to 2.0 isocyanate groups are present for one hydroxyl group of the binder component. Excess isocyanate groups can be removed by reaction with moisture and contribute to the cross-linking. Aliphatic and/or cycloaliphatic polyisocyanates can be used, such as hexamethylene diisocyanate, trimethylhexamethylene diisocyanate and isophorone diisocyanate.

Examples of such polyisocyanates are a reaction product containing biuret groups from 3 moles of hexamethylene diisocyanate with 1 mole of water, with an NCO content of ca. 22% (corresponding to the commercial product Desmodur N® of BAYER AG); a polyisocyanate containing isocyanurate groups that is manufactured by trimerization of 3 moles of hexamethylene diisocyanate with an NCO content of about 21.5% (corresponding to the commercial product Desmodur N 3390® of BAYER AG); or polyisocyanate containing urethane groups, which are reaction products from 3 moles of tolylene diisocyanate and 1 mole of trimethylolpropane with an NCO content of about 17.5% (corresponding to the commercial product Desmodur L® of BAYER AG). Desmodur N® and Desmodur N 3390® preferably are used.

The coating agents for transparent or pigmented top coatings that contain the (meth)acrylic copolymers to be used according to the invention can contain, in addition to solvents, as for example the solvents already mentioned for the manufacture by solution polymerization, auxiliary substances customary in paints, such as for example light stabilizers, levelling agents based on (meth)acrylic homopolymers, silicone oils, plasticizers such as esters of phosphoric acid, phthalic acid or citric acid; thixotroping agents, pyrogenic silica, hydrogenated castor oil; curing accelerators for the reaction of the (meth)acrylic copolymers according to the invention with polyisocyanate resins, e.g.

organic metal salts such as dibutyltin dilaurate and zinc naphthenate; and furthermore compounds containing tertiary amino groups, such as triethylamine and dimethylaminoethanol. Customary organic or inorganic lacquer pigments are suitable as pigments.

For increasing the solids content, a proportion of high-solid resins, which optionally contain reactive diluents, can be co-utilized in the coating agents according to the invention without loss of properties.

The coating agents according to the invention are particularly suitable for the production of coatings which have very short drying times of, e.g. 15 to 20 minutes at low temperatures of e.g. 20° to 80° C., preferably up to 60° C. The obtained coatings are not sticking even if they are still warm after drying. The obtained products can immediately assembled.

It is a further advantage of the coating agents of the invention that they can provide thick layers of about 35 to 120 μm without problems. The application of such thick layers can be achieved even in only one single spraying operation. In practice layers of up to 60 μm and not less than 50 μm are preferred. The mentioned thickness refers to the dry film thickness. Such thick layers can be achieved without sagging, without blisters and without any troubles even when lacquering in only one spraying operation. Overspray is absorbed during the spraying operation by the obtained coating without causing any troubles. This is very surprising since the coatings are very fast drying. Therefore, it is possible to use the coating agents of the present invention for total lacquering of substrates such as motorvehicle bodies and their parts. The coating agents of the invention are particularly suitable for the repair lacquering of motorvehicle bodies and their parts. In this respect it is also possible to use the coating agents of the present invention for the production of pigmented or transparent top coating of an air-drying of forced-drying multilayer coating. A transparent top coating can be applied for example by the wet-on-wet process to conventional or aqueous base coats, where upon both coats are cured together for e.g. 15 to 20 minutes at e.g. 50° to 80° C. The invention therefore also relates to processes for the production of multilayer coatings or the use of the coating agents for the production of multilayer coatings wherein in particular the top coat and/or clear coat layers of multilayer coatings are produced by the coating agents according to the invention.

The following examples serve to clarify the invention. All parts relate to weight.

RESIN EXAMPLES 1 TO 3

Preparation of the (Meth)acrylic Copolymers, Component A

In a 2-liter three-necked ground-glass flask, which is fitted with a stirrer, contact thermometer, bulb condenser and dropping funnel, item 1 (quantities can be found in Table 1) is charged and heated with stirring and, with reflux condenser connected, to 140° C. Over 6 hours, item II (monomer mixture+initiator) is fed continuously from the dropping funnel. After the end of the addition, the dropping funnel is rinsed out with item III, and the rinsings added to the reaction material. The batch is then post-polymerized for 4 hours at ca. 139° C., so that the conversion exceeds 99%. The reaction mixture is subsequently cooled to 100° C. and diluted with item IV to a solids content of ca. 55%.

Comparative Test 1 (Example 2 of DE-OS 24 60 329)

280 g styrene, 170 g butyl acrylate, 220 g 2-hydroxyethyl methacrylate, 7 g acrylic acid and 100 g AIBN were dissolved in so much toluene that the total volume amounted to 3 l. This solution was added dropwise over 3 hours at a constant rate to 500 ml of toluene-heated to the reaction temperature. The mixture was stirred for a further 1 hour and solvent, residual monomers and tetramethylsuccinic acid dinitrile removed in vacuo. The (meth)acrylic copolymer had an acid number of 5.6 mg KOH/g and a viscosity of 1880 mPa.s/25° dissolved at 68.0% concentration in ethyl glycol acetate.

Comparative Test 2 (Example 7 of DE-OS 24 60 329)

400 g styrene, 400 g butyl acrylate, 400 g 2-hydroxyethyl methacrylate, 30 g acrylic acid and 180 g AIBN were dissolved in so much toluene that the total volume amounted to 3 l. This solution was added dropwise over 3 hours at a constant rate to 750 ml each of toluene and isobutanol heated to the reaction-temperature. The mixture was stirred for a further 1 hour and solvent, residual monomers and tetramethylsuccinic acid dinitrile removed in vacuo. The (meth) acrylic copolymer had an acid number of 14.4 mg KOH/g and a viscosity of 2950 mPa.s/25° dissolved at 69.1% concentration in ethyl glycol acetate.

TABLE 1

(weighings in grams)

| Item: | Constituents | Resin Examples | | |
|---|---|---|---|---|
| | | 1 | 2 | 3 |
| I | xylene | 50 | 50 | 50 |
| | Butyl acetate | 131 | 131 | 131 |
| | Solvesso 100 | 162 | 162 | 162 |
| II | Styrene | 275 | 275 | 254 |
| | n-Butyl acrylate | 89 | 75 | 72 |
| | 2-Hydroxyethyl methacrylate | 166 | 178 | 191 |
| | Acrylic acid | 4 | 6 | 7 |
| | Di-tert-butyl peroxide | 4 | 4 | 4 |
| | Tert-butyl peroxyoctanoate | 12 | 12 | 12 |
| III | Butyl acetate | 30 | 30 | 30 |
| IV | Butyl acetate | 77 | 77 | 77 |
| | | 1000 | 1000 | 1000 |

Characteristics:
Solids (%) 55.7 55.2 56.4
Viscosity (mPa.s at 25° C.) 1235 1850 2380
Hydroxyl number (relative to solid resin) 134 140 150
Acid number (relative to solid resin) 8.1 9.9 11.2
Glass transition temperature (°C.) 49 53 53

Production of Clear Coats Using the Copolymers of Resin Examples 1–3 (Component A) and the Binder Components from the Comparative Tests 1 and 2

1st Clear Coat according to the Invention (Component A according to Preparative Example 1)

To a cleaned dry vessel, 0.930 pts. wt. (=parts by weight) of n-butyl acetate (98/100%), 5.000 pts. wt. of Solvesso 100®, 2.570 pts. wt. of mixed xylene isomers, 0.750 pts. wt. of light stabilizer of the benzotriazole type, 0.750 pts. wt. of light stabilizer of the HALS type and 1.500 pts. wt. of a 10% solution of silicone oil in n-butyl acetate (98/100%) are charged and thoroughly mixed. Then 88.500 pts. wt. of the copolymer containing hydroxyl groups prepared according to the invention (preparative example 1) (55% solids content; component A) are added and stirred. A clear coat results, with an efflux time of ca. 180 seconds (efflux time with DIN cup 4, DIN 53211, 20° C.). The efflux time is then adjusted to ca. 50 seconds (efflux time with DIN cup 4, DIN 53211, 20° C.) with ca. 15 pts. wt. of 98/100% n-butyl acetate.

Comparison:

2nd Clear Coat with the Copolymer from Comparative Test 1

To a cleaned dry vessel, 9.557 pts. wt. of n-butyl acetate (98/100%), 10.749 pts. wt. Solvesso 100®, 4.369 pts. wt. of mixed xylene isomers, 0.750 pts. wt. of light stabilizer of the benzotriazole type, 0.750 pts. wt. of light stabilizer of the HALS type and 1.500 pts. wt. of a 10% solution of silicone oil in n-butyl acetate (98/100%) are charged and thoroughly fixed. Then 72.325 pts. wt. of the copolymer from comparative test 1 are added and mixed. The result is a clear coat with an efflux time of ca. 160 seconds (efflux time with DIN cup 4, DIN 53211, 20° C.). The efflux time is then adjusted to ca. 50 seconds (efflux time with DIN cup 4, DIN 53211, 20° C.) with ca. 13 pts. wt. of 98/100% n-butyl acetate.

Comparison:

3rd Clear Coat with the Copolymer from Comparative Test 2

To a cleaned dry vessel, 8.380 pts. wt. of n-butyl acetate (98/100%), 9.962 pts. wt. Solvesso 100®, 4.117 pts. wt. of mixed xylene isomers, 0.750 pts. wt. of light stabilizer of the benzotriazole type, 0.750 pts. wt. of light stabilizer of the HALS type and 1.500 pts. wt. of a 10% solution of silicone oil in n-butyl acetate (98/100%) are charged and thoroughly mixed. Then 74.541 pts. wt. of the copolymer from comparative test 2 are added and mixed. The result is a clear coat with an efflux time of ca. 165 seconds (efflux time with DIN cup 4, DIN 53211, 20° C.). The efflux time is then adjusted to ca. 50 seconds (efflux time with DIN cup 4, DIN 53211, 20° C.) with ca. 12 pts. wt. of 98/100% n-butyl acetate.

Production of a Hardening Solution (Component B)

The following hardener was prepared as second component (component B) of the coating agent:

| | Pts. wt. |
|---|---|
| Aliphatic polyisocyanate based on hexamethylene diisocyanate (Desmodur ® N 3390/90) | 43.400 |
| Mixed xylene isomers | 12.500 |
| Solvesso 100 ® (hydrocarbon mixture, boiling range: 164–180° C.) | 27.000 |
| Methoxypropyl acetate | 4.000 |
| n-Butyl acetate (98%) | 8.860 |
| Ethoxypropyl acetate | 4.100 |
| Dibutyltin dilaurate solution (10%) | 0.140 |
| | 100.000 |

Application of the Coating Agents Obtained

The above prepared coating agents or clear coats containing binder A or binders according to the comparative tests 1 and 2 were each mixed shortly before processing in the volume ratio of 50.0% (binder A), 47.2% (comparative test 1) and 46.5% (comparative test 2) with the above hardener (component B) of the coating agent. The slight divergences of the mixing ratio are necessary for the 100% cross-linking.

The chemically curing coatings obtained were applied by spray application in a dry film thickness of 50 μm to 60 μm by the wet-on-wet process to a layer of base coat and, after a flashing-off phase of 5 minutes, then cured for 20° minutes at 60° C. The results of the lacquer-technology investigations are shown in the following table.

Table of Lacquer-Technology Investigations

|  | Comparative Test 1 | Comparative Test 2 | Component A |
|---|---|---|---|
| Viscosity, seconds Mixture, by vol. % | ca. 50 | ca. 50 | ca. 50 |
| Component A | 100 | 100 | 100 |
| Component B | 47.2 | 46.5 | 50 |
| Degree of cross-linking in % | 100 | 100 | 100 |
| Processing viscosity, sec. | 18–19 | 18–19 | 18–19 |
| Dustfree drying according to DIN 53150 Air drying (16 hours at 20° C.) | 15 min. | 15 min. | 5 min. |
| Freedom from tack | + | + | + |
| Body/gloss | + | + | + |
| Flow | + | + | + |
| Masking test (adhesive tape) 5 minutes (marking after removal of the adhesive tape) | – | (–) | + |
| Disappearance of the marking | above 60 min not disappeared | above 60 min | after 60 min disappeared |
| Premium gasoline drainage (swelling) Oven drying (20 min at 60° C.) | swells | swells | does not swell |
| Tack freedom, hot | — | – | + |
| Tack freedom, cold | – | – | + |
| Hardness | – | (–) | + |
| Body, gloss | + | + | + |
| Flow | + | + | + |
| Masking test (adhesive tape) 5 minutes | — | — | + |
| Disappearance of the marking | — | — | + |
| Masking test (adhesive tape) 30 minutes after additional 16 hours air drying at 20° C. | — | – | + |
| Disappearance of the marking | – | – | + |
| Premium gasoline drainage | – | (–) | + |

Key
+ = very good
(–) = satisfactory
– = poor
— = very poor

This key applies also to the following pigmented coating agents.

Production and Use of Pigmented Coating Agents

For the production of a solution usable for all pigmented formulations the following mixture (in pts. wt.) is produced.

| Component A (preparative example 1) | 85.116 |
|---|---|
| Xylene | 8.851 |
| Solvesso 100 | 0.892 |
| Butyl acetate, 98/100% | 3.575 |
| Silicone oil solution, 10% in butyl acetate, 98/100% | 1.200 |
| Diethanolamine | 0.330 |
| Dibutyltin dilaurate solution, 10% in butyl acetate | 0.036 |
|  | 100.000 |

The following pigmented formulations were produced by customary dispersion processes, using ordinary commercial, wetting, dispersing, and antisettling agents.
a) white with titanium dioxide
b) black with FW 200 black
c) red with Irgazin red 80.

Formulations:

|  | white | black | red |
|---|---|---|---|
| Binder solution | 20.00 | 30.00 | 20.00 |
| Dispersant | 1.62 | | |
| Ordinary commercial anti-settling agent | 6.50 | | |
| Dispersant | | 5.60 | 1.50 |
| Titanium dioxide | 40.48 | | |
| FW 200 black | | 5.56 | |
| Irgazin red | | | 8.30 |
| Predispersion with the dissolver | | | |
| Binder solution | 31.40 | 34.00 | 31.00 |
| Bead mill dispersion | | | |
| Binder solution | 28.40 | 39.20 | |

These grinding pastes, mixed as follows with the binder solution, are adjusted to ca. 100 seconds (efflux time with DIN cup 4, DIN 53211, 20° C.) with butyl acetate 98/100%.

| | | | |
|---|---|---|---|
| Grinding paste | 61.76 | 31.00 | 43.90 |
| Binder solution | 39.24 | 69.00 | 56.10 |

Shortly before use, each coating agent was mixed in the volume ratio of 50.0% with the hardener (component B) of the coating agent.

The chemically curing coatings obtained were applied by spraying at a dry film thickness of 50 μm to 60 μm by the wet-on-wet process to a base coat layer and, after a flashing-off phase of 5–10 minutes, then cured for 20 minutes at 60° C. The results of the lacquer technology investigations are shown in the following table.

Table of Lacquer-Technology Investigations

| | Lacquer-technology Examples: | | |
|---|---|---|---|
| | white | black | red |
| Viscosity in seconds | 20 | 20 | 20 |
| Dust-free drying according to DIN 53150 Air drying (16 hours at 20° C.) | 15 min | 15 min | 15 min |
| Freedom from tack | + | + | + |
| Body/gloss | + | + | + |
| Flow | + | + | + |
| Masking test (adhesive tape) 5 minutes | + | + | + |
| Disappearance of the marking | + | + | + |
| Premium gasoline drainage Oven drying (20 min at 60° C.) | + | + | + |
| Tack freedom, hot | + | + | + |
| Tack freedom, cold | + | + | + |
| Hardness | + | + | + |
| Body/gloss | + | + | + |
| Flow | + | + | + |
| Masking test (adhesive | + | + | + |

-continued

Table of Lacquer-Technology Investigations

| | Lacquer-technology Examples: | | |
|---|---|---|---|
| | white | black | red |
| tape) 5 minutes Disappearance of the marking | + | + | + |
| Masking test (adhesive tape) 30 minutes after additional 16 hours air air drying at 20° C. | + | + | + |
| Disappearance of the marking | + | + | + |
| Premium gasoline drainage | + | + | + |

We claim:

1. An epoxy and nitrocellulose-free coating agent for pigmented and transparent top coatings, which comprises as a binder
    (A) a methacrylic copolymer containing hydroxy groups,
        (i) from 47 to 53% wt. of an aromatic vinyl compound,
        (ii) from 28 to 33% wt. of a hydroxyalkyl methacrylate,
        (iii) from 14 to 19% wt. of an alkyl (meth)acrylate, and
        (iv) from 0.5 to 2% wt. of acrylic acid or methacrylic acid, having a hydroxyl number of from 120 to 160 mg KOH/g, an acid number of from 5 to 15 mg KOH/g, a weight average molecular weight of from 10,000 to 20,000, and a glass transition temperature of from 40° C. to 60° C., and
    (B) an aliphatic and/or cycloaliphatic polyisocyanate or a mixture of such polyisocyanates, in an amount such that from 0.5 to 2.0 isocyanate groups are present for each hydroxyl group of component (A).

2. The coating agent of claim 1, wherein
    (i) is styrene or a styrene derivative,
    (ii) is a hydroxyethylmethacrylate, and
    (iii) is n-butylmethacrylate.

3. The coating agent of claim 1, wherein
    (i) is from 47.5 to 52.5 percentage wt. styrene,
    (ii) is from 28.0 to 33.0 percentage wt. 2-hydroxyethylmethacrylate,
    (iii) is from 14.0 to 19.0 percentage wt. n-butylacrylate, and
    (iv) is from 0.5 to 1.5 percentage wt. acrylic acid.

4. The coating agent of claim 1, wherein the component (B) has a functionality of 3 or more, and has an NCO number of from 15 to 25.

5. Process for the production of a pigmented top coating, characterized in that a pigment containing coating agent according to claim 1 is used and said process is carried out by spray application of a coating agent at a dry film thickness of up to 120 um using only one spraying operation.

6. Process for the production of a multilayer coating, characterised in that on an optionally pretreated substrate, a coating layer of a solvent-based or water-based base coat is applied and recoated with a pigment-free, transparent coating agent according to claim 1.

7. Process according to claim 6, characterised in that the transparent coating agent is applied wet-on-wet to the base coat layer and cured together with the latter.

8. Process according to claim 5, characterized in that the obtained coatings are dried at temperatures of 20° to 80° C.

9. Process according to claim 5, characterized in that the coatings are dried during 15 to 20 minutes.

10. Process according to claim 5, characterized in that it is carried out for repair lacquering of motorvehicle bodies and their parts.

* * * * *